(12) United States Patent
Lee et al.

(10) Patent No.: US 12,204,156 B2
(45) Date of Patent: Jan. 21, 2025

(54) OPTICAL CABLE

(71) Applicant: LS CABLE & SYSTEM LTD., Anyang-si (KR)

(72) Inventors: Man Su Lee, Daegu (KR); Tae Gyoung Kim, Gunpo-si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 0 days.

(21) Appl. No.: 18/287,706

(22) PCT Filed: Oct. 28, 2022

(86) PCT No.: PCT/KR2022/016643
§ 371 (c)(1),
(2) Date: Oct. 20, 2023

(87) PCT Pub. No.: WO2023/075483
PCT Pub. Date: May 4, 2023

(65) Prior Publication Data
US 2024/0159981 A1 May 16, 2024

(30) Foreign Application Priority Data

Oct. 28, 2021 (KR) .................. 10-2021-0145632
Oct. 27, 2022 (KR) .................. 10-2022-0140600

(51) Int. Cl.
*G02B 6/44* (2006.01)

(52) U.S. Cl.
CPC ....... *G02B 6/44384* (2023.05); *G02B 6/4404* (2013.01); *G02B 6/448* (2013.01); *G02B 6/449* (2013.01)

(58) Field of Classification Search
CPC .................. G02B 6/44384; G02B 6/4404
See application file for complete search history.

(56) References Cited

U.S. PATENT DOCUMENTS

| 2020/0225435 A1* | 7/2020 | Sahoo ................ G02B 6/44384 |
| 2021/0055491 A1* | 2/2021 | Kumar ................ G02B 6/4403 |
| 2021/0116659 A1* | 4/2021 | Kumar ................ G02B 6/4403 |
| 2021/0223491 A1* | 7/2021 | Shimizu ............. G02B 6/4403 |

(Continued)

FOREIGN PATENT DOCUMENTS

| JP | 2015517679 A | 6/2015 |
| KR | 20120081817 A | 7/2012 |

(Continued)

OTHER PUBLICATIONS

International Search Report for related International Application No. PCT/KR2022/016643; action dated May 4, 2023; (3 pages).

(Continued)

*Primary Examiner* — Eric Wong
(74) *Attorney, Agent, or Firm* — K&L Gates LLP

(57) ABSTRACT

The present disclosure relates to an optical unit including a tubular member, which accommodates a plurality of optical fibers and whose shape is variable to achieve an optimal space factor, to minimizes optical loss or the deterioration of optical properties when the optical cable is bent or compressed or external impact is applied, secure waterproof performance, and minimize an outer diameter, and an optical cable including the same.

6 Claims, 3 Drawing Sheets

(56) References Cited

U.S. PATENT DOCUMENTS

| | | | |
|---|---|---|---|
| 2023/0251450 A1* | 8/2023 | Sato | G02B 6/4403 385/114 |
| 2024/0210642 A1* | 6/2024 | Zhao | G02B 6/4434 |

FOREIGN PATENT DOCUMENTS

| KR | 1020190018704 A | 2/2019 |
|---|---|---|
| KR | 20210011344 A | 2/2021 |
| KR | 1020210014166 A | 2/2021 |
| KR | 20210086206 A | 7/2021 |
| KR | 20210127385 A | 10/2021 |

OTHER PUBLICATIONS

Written Opinion for related International Application No. PCT/KR2022/016643; action dated May 4, 2023; (8 pages).

* cited by examiner

OPTICAL CABLE

CROSS-REFERENCE TO RELATED APPLICATIONS

The present application is a National Stage of International Application No. PCT/KR2022/016643 filed on Oct. 28, 2022, which claims the benefit of Korean Patent Application No. 10-2021-0145632, filed on Oct. 28, 2021, and Korean Patent Application No. 10-2022-0140600, filed on Oct. 27, 2022 with the Korean Intellectual Property Office, the entire contents of which are hereby incorporated by reference.

FIELD

The present disclosure relates to an optical cable. More specifically, the present disclosure relates to an optical unit including a tubular member, which accommodates a plurality of optical fibers and whose shape is variable to achieve an optimal space factor, to minimizes optical loss or the deterioration of optical properties when the optical cable is bent or compressed or external impact is applied, secure waterproof performance, and minimize an outer diameter, and an optical cable including the same.

BACKGROUND

Recently, with an increase in the demand for ultra-high-speed communication, the demand for an optical cable-based communication network is continuously increasing. An optical cable has a large bandwidth and is heavy and bulky compared to an existing copper cable and thus is very advantageous to build an ultra-high-speed transmission network.

To build a large-capacity optical communication network, an optical cable may include a plurality of optical units in a cable jacket, and each of the optical units includes a tubular member in which a plurality of optical fibers are accommodated.

In each of the optical units, a plurality of optical fibers are accommodated in a tubular member. The plurality of optical fibers may be accommodated individually in the tubular member or a plurality of rollable optical fiber ribbons that are obtained by aggregating a plurality of optical fibers by binding at least portions of adjacent optical fibers and that are rollable in a width direction may be accommodated in one tubular member.

In the case of a large-capacity optical cable with a plurality of optical units, an outer diameter is preferably minimized and waterproof performance should be ensured.

The outer diameter of the large-capacity optical cable may be determined by a space factor of optical fibers in each of the plurality of optical units of the large-capacity optical cable.

When an internal space factor of the tubular member of the optical units is increased, a total outer diameter of the optical cable decreases but a waterproof material, such as waterproof powder, waterproof yarn, or waterproof jelly, filled in the tubular member for the purpose of waterproofing cannot be evenly distributed between optical fibers. Thus, when moisture permeates, it is difficult to secure sufficient waterproof performance, thus causing an increase in optical loss or the deterioration of optical properties when the optical cable is bent or compressed or when external impact is applied.

When the internal space factor of the tubular member of the optical unit is reduced to prevent optical loss or the deterioration of optical properties, an internal space or gaps of the tubular member cannot be sufficiently covered with the waterproof material, thus resulting in a decrease in waterproof performance and an increase in the outer diameter of the optical cable.

Accordingly, there is a need for a large-capacity optical cable in which optical loss or the deterioration of optical properties is minimized, waterproof performance of each optical unit is secured, and an increase in an outer diameter of the optical cable is minimized.

SUMMARY

The present disclosure is directed to providing an optical unit including a tubular member, which accommodates a plurality of optical fibers and whose shape is variable to achieve an optimal space factor, to minimizes optical loss or the deterioration of optical properties when the optical cable is bent or compressed or external impact is applied, secure waterproof performance, and minimize an outer diameter, and an optical cable including the same.

To achieve these objects, the present disclosure provides an optical cable comprising: a cable core comprising a plurality of optical units each including a plurality of optical fibers and a tubular member accommodating the plurality of optical fibers; and a cable jacket covering the cable core, wherein a shape of the tubular member is changed when accommodated in the cable jacket while the plurality of optical fibers are accommodated in the tubular member, the plurality of optical fibers comprise a form of optical fiber ribbon in which six or more optical fibers are arranged in parallel in a longitudinal direction and at least portions of each pair of adjacent optical fibers are bonded by a binding material, at least one optical fiber ribbon is arranged and accommodated in a curved shape in the tubular member with respect to a cross section of the optical cable, and in each of the plurality of optical units, a space factor of optical fibers in the tubular member is in a range of 68% to 83%.

And the space factor of the optical fibers may be in a range of 53% to 75% before a change in a shape of each of the plurality of optical units.

And a shape of the tubular member of each of the plurality of optical units may be changed to an indefinite form corresponding to a shape of a space in contact with the cable jacket.

And there may be an empty space between the plurality of optical units in the cable jacket or between the cable jacket and the plurality of optical units.

And the plurality of optical units may have different cross-sectional areas.

And before the change in the shape, the tubular member of each of the plurality of optical units may have a circular shape, an oval shape, or a polygonal pipe shape, may have a thickness of 0.1 mm to 0.5 mm, and may be formed of a polyolefin-based resin with a Shore D hardness of 20 to 40.

And hardness of the cable jacket may be higher than that of the tubular member.

And a modulus of elasticity of the cable jacket may be higher than that of the tubular member.

And the tubular member of each of the plurality of optical units may comprise a waterproof material.

And a waterproof material may be included between the cable jacket and the plurality of optical units.

And the waterproof material may comprise at least one of waterproof powder, waterproof yarn, or waterproof jelly.

And a halogen-free flame retardant material may be added to the polyolefin-based resin.

And the cable core may be formed by twisting a plurality of optical units with a predetermined pitch.

And the cable core may be formed by binding a plurality of optical units by a binding member.

And a ripcord may be provided between an inner circumferential surface of the cable jacket and an outer circumferential surface of the cable core.

And a plurality of reinforcing members may be embedded in the form of wire at separate or symmetrical positions in the cable jacket in the longitudinal direction, the plurality of reinforcing members being formed of fiber-reinforced plastics (FRP).

And 100 to 400 optical fibers may be accommodated in the tubular member of each of the plurality of optical units.

And the number of the optical units of the optical cable may be 20 or less.

And the optical fibers accommodated in the tubular member of each of the plurality of optical units may comprise a plurality of rollable optical fiber ribbons each including a plurality of optical fibers.

And the plurality of optical units may be bound by a binding member to form the cable core.

And to achieve these objects, the present disclosure provides an optical cable comprising: a plurality of optical units each including a tubular member accommodating therein a plurality of optical fiber ribbons in which a plurality of optical fibers are intermittently bonded with each other; and a cable jacket covering the plurality of optical units, wherein a space factor of the optical fibers in each of the plurality of optical units is in a range of 53% to 75% before the plurality of optical units are covered with the cable jacket, and a space factor of the optical fibers in each of the plurality of optical units is in a range of 68% to 83% after the plurality of optical units are covered with the cable jacket, wherein the space factor is calculated by an equation of: space factor of optical fibers in optical unit=sum of cross-sectional areas of all optical fibers in tubular member/internal cross-sectional area of tubular member×100%.

And to achieve these objects, the present disclosure provides an optical cable comprising: a plurality of optical units each including a tubular member accommodating therein a plurality of optical fiber ribbons in which a plurality of optical fibers are intermittently bonded with each other; and a cable jacket covering the plurality of optical units, wherein a strain ratio of an internal cross-sectional area of the tubular member after the plurality of optical units are covered with the cable jacket to an internal cross-sectional area of the tubular member before the plurality of optical units are covered with the cable jacket is in a range of 7% to 41%, wherein the strain ratio is calculated by an equation of: strain ratio of internal cross-sectional area of optical unit=(|internal cross-sectional area of tubular member after covered with cable jacket-internal cross-sectional area of tubular member before covered with cable jacket|)/internal cross-sectional area of tubular member before covered with cable jacket×100%.

And to achieve these objects, the present disclosure provides an optical cable a manufacturing method of an optical cable, comprising: preparing rollable optical fiber ribbons by binding a plurality of optical fibers in parallel by forming multiple bonded parts at separate positions between adjacent optical fibers; preparing each of optical units by extruding a tubular member accommodating a plurality of rollable optical fiber ribbons therein to achieve an internal space factor of 53% to 75%; forming a cable core by aggregating the plurality of optical units; and covering with a cable jacket by supplying the cable core formed in the forming of the cable core and covering the cable core with the cable jacket.

And in the covering with the cable jacket, a space factor of optical fibers in the tubular member of each of the optical units may be in a range of 68% to 83% due to a change in a shape of the tubular member.

And in the covering with the cable jacket, a strain ratio of an internal cross-sectional area of each of the optical units may be in a range of 7% to 41% due to a change in a shape of the tubular member of each of the optical units, wherein the strain ratio is calculated by an equation of: strain ratio of internal cross-sectional area of optical unit=(internal cross-sectional area of optical unit before change in shape-internal cross-sectional area of optical unit after change in shape)/internal cross-sectional area of optical unit before change in shape×100%.

And the forming of the cable core may comprise forming the cable core by aggregating the plurality of optical units by twisting the plurality of optical units with a predetermined pitch.

And the forming of the cable core may comprise forming the cable core by aggregating the plurality of optical units with a binding member.

And to achieve these objects, the present disclosure provides a manufacturing method of an optical cable, comprising: preparing each of optical units by extruding a tubular member accommodating a plurality of optical fibers therein to achieve an internal space factor of 53% to 75%; forming a cable core by aggregating optical units by twisting the optical units with a predetermined pitch; and covering with a cable jacket by supplying the cable core formed in the forming of the cable core and covering the cable core with the cable jacket.

And in the forming of the cable jacket, a space factor of optical fibers in the tubular member of each of the optical units may be in a range of 68% to 83% due to a change in a shape of the tubular member.

And in the covering with the cable jacket, a strain ratio of an internal cross-sectional area of each of the optical units may be in a range of 7% to 41% due to a change in a shape of the tubular member of each of the optical units, wherein the strain ratio is calculated by an equation of: strain ratio of internal cross-sectional area of optical unit=(internal cross-sectional area of optical unit before change in shape-internal sectional area of optical unit after change in shape)/internal cross-sectional area of optical unit before change in shape of tubular member×100%.

According to an optical cable of the present disclosure, a cable core is configured to include a plurality of optical units, and a diameter of the optical cable can be minimized by limiting a space factor of optical fibers to be in an appropriate range during the accommodation of the plurality of optical units in the optical cable.

According to the optical cable of the present disclosure, a space factor of optical fibers to be included in a cable core can be limited to be in an appropriate range to provide sufficient waterproof performance while preventing excessive usage of a waterproof material.

In addition, according to the optical cable of the present disclosure, a space factor of optical fibers included in the cable core can be changed to be in an appropriate range to minimize optical loss or the deterioration of optical properties when the optical cable is bent or compressed or external impact is applied.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

Figure 1:
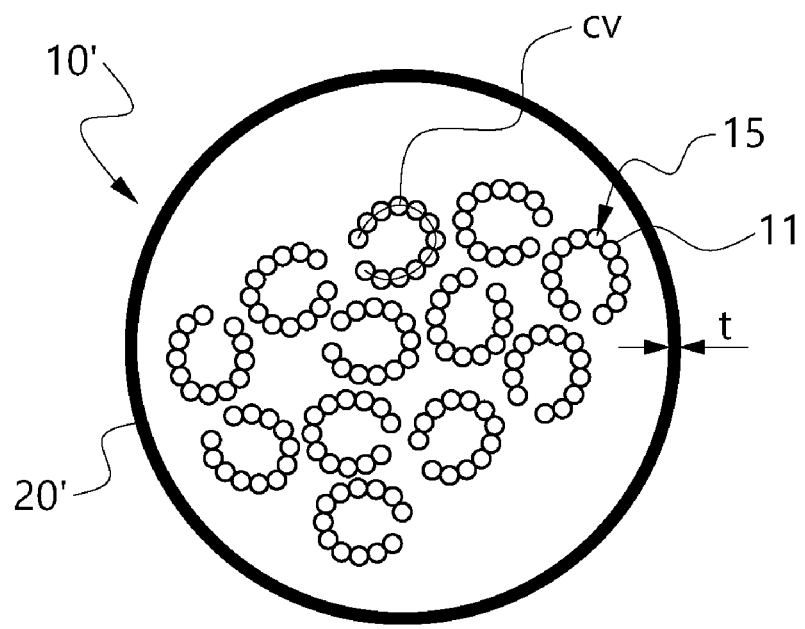
FIG. 1 is a cross-sectional view of an optical unit in which the extruding of a tubular member is completed in a manufacturing process an optical unit of an optical cable according to the present disclosure.
Figure 2:
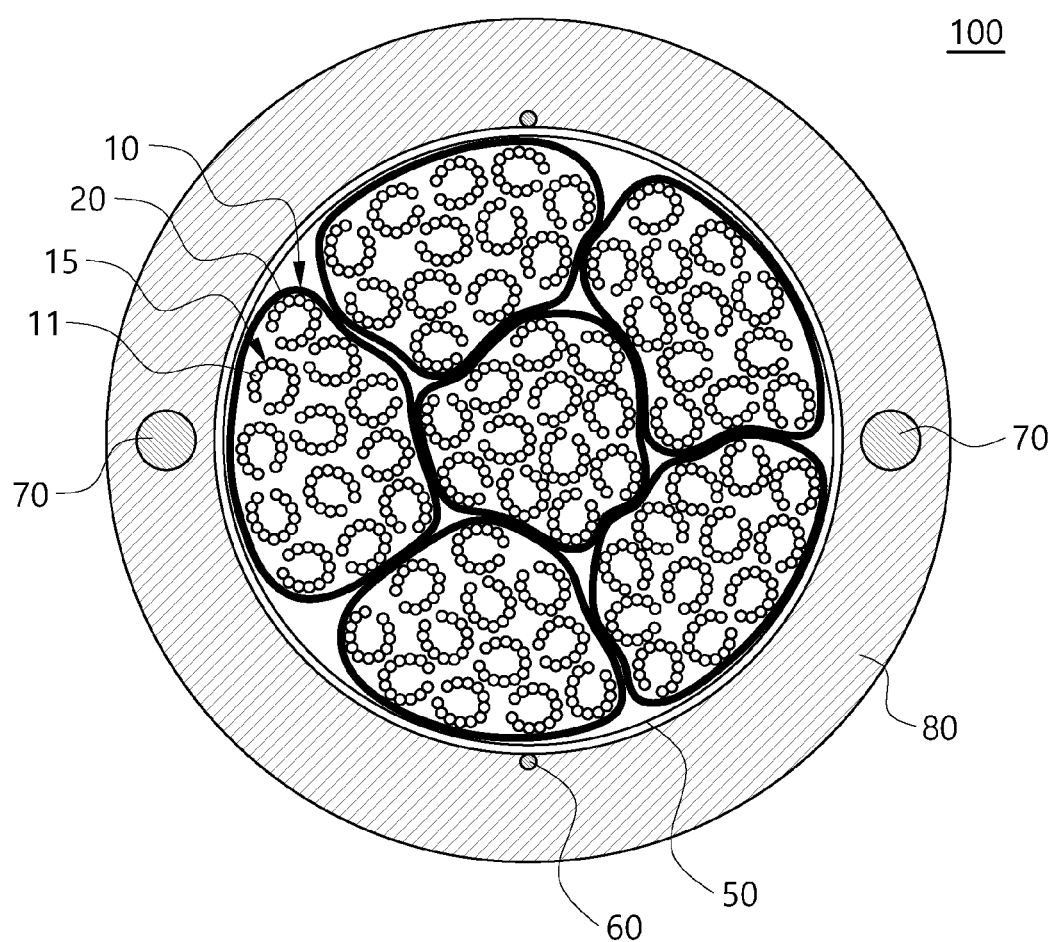
FIG. 2 is a cross-sectional view of an optical cable in which an optical unit as shown in FIG. 1 is accommodated in a cable jacket, according to an embodiment.

FIG. 1 is a cross-sectional view of an optical unit 10' in which the extruding of a tubular member is completed in a manufacturing process an optical unit of an optical cable according to the present disclosure. FIG. 2 is a cross-sectional view of an optical cable in which an optical unit 10 as shown in FIG. 1 is accommodated in a cable jacket, according to an embodiment.

An optical cable 100 according to the present disclosure is a large-capacity optical cable including, for example, 864, 1728, 3456, or 6912 optical fibers 11, and is configured to minimize optical loss or the deterioration of optical properties when the optical cable 100 is bent or compressed or external impact is applied thereto, secure waterproof performance, and minimize an outer diameter.

The optical cable 100 having a large capacity may be manufactured by configuring a plurality of optical units 10 to each accommodate multiple optical fibers 11, aggregating the plurality of optical units 10, and covering the aggregated optical units 10 with a cable jacket 80.

Specifically, the optical cable 100 according to the present disclosure includes a cable core C with a plurality of optical units 10 each including a plurality of optical fibers 11 and a tubular member 20 accommodating the optical fibers 11, and a cable jacket 80 covering the cable core C. When the tubular member 20 accommodating the plurality of optical fibers 11 therein is disposed in the cable jacket 80, the shape of a cross section of the tubular member 20 is changed in a longitudinal direction and a space factor of the optical fibers 11 in the tubular member 20 of the optical unit 10 is changed.

In an optical unit 10' shown in FIG. 1, 144 optical fibers 11 are accommodated in a circular tubular member 20, and the 144 optical fibers 11 may form 12 rollable ribbons that include 12 optical fibers 11 and are rollable in a width direction. The number of optical fibers 11 constituting one rollable optical fiber ribbon 15 accommodated in the tubular member 20 of the optical unit 10 or the number of optical units 10 may be increased or decreased. Preferably, the number of optical fibers 11 constituting one rollable optical fiber ribbon 15 is six or more.

Because the rollable optical fiber ribbon 15 is configured to be rollable in the width direction, the rollable optical fiber ribbon 15 may be arranged in a curved shape with respect to a cross section of the cable and accommodated in the tubular member 20. As shown in FIG. 1, when the centers of adjacent optical fibers 11 included in each rollable optical fiber ribbon 15 with respect to a cross section of the cable are connected to each other to form a curved form CV, a plurality of rollable optical fiber ribbons 15 may be accommodated in the tubular member 20 while reducing an empty space, thereby smoothly controlling a space factor of optical fibers in each optical unit.

The optical unit 10' may be manufactured by preparing each of optical units by extruding a tubular member accommodating rollable optical fiber ribbons 15 therein to achieve an internal space factor of 53% to 75%.

That is, each optical unit 10 may include one or more rollable optical fiber ribbons 15. Each of the rollable optical fiber ribbons 15 is an aggregate of optical fibers 11 in which a plurality of optical fibers 11 are bonded to each other in parallel in a width direction and which is rollable in the width direction, and may be applied to increase an internal space factor of each optical unit 10 when the optical cable 100 having a large capacity is manufactured, because the optical fibers 11 are not separated even when rolled up.

The rollable optical fiber ribbon 15 may be manufactured by preparing a rollable optical fiber ribbon by binding a plurality of optical fibers in parallel by forming multiple bonded parts at separate positions between adjacent optical fibers 11 using a binding material such as UV curable acrylate resin.

The number of rollable optical fiber ribbons 15 to be included in each optical unit 10 may be increased or decreased, and the optical unit 10 may be in the form of general optical fiber ribbon or a form in which a plurality of optical fibers are accommodated or aggregated in an aggregation means rather than the form of rollable optical fiber ribbon.

The tubular member 20 of the optical unit 10 may be formed in a circular, oval or polygonal pipe shape having a thickness of 0.1 mm to 0.5 mm during the tubing of a plurality of optical fibers. The tubular member 20 may be formed of polyolefin-based resin which has heat resistance, is light, and provides transparency when needed or a material which has shore D hardness of about 20 to 40 and whose shape is changed without being broken when an external force or a compressive force is applied. A halogen-free flame retardant material may be added to the polyolefin-based resin to reinforce flame retardancy.

In addition, a waterproof material such as waterproof powder, waterproof yarn, or waterproof jelly may be added into the tubular member 20 of the optical unit 10' to provide waterproof performance.

The optical unit 10' may be configured to have an internal space factor of 53% to 75% in a state in which the optical fibers 11 are accommodated therein.

As described above, an internal space factor of the optical unit 10' manufactured by a tubular member extruding process during the preparing of each of the optical units is a space factor before the cable core is formed by aggregating a plurality of optical units. By forming a relatively large empty space in the tubular member, the waterproof material or the like may be evenly applied on the inside of the tubular member in the tubular member extruding process.

The optical unit 10' may be configured to include a number of rollable optical fiber ribbons by accommodating a number of optical fibers in the tubular member. Similarly, in this case, the space factor of the plurality of optical fibers accommodated in the tubular member is set to be in a range of 53% to 75%.

Due to the set internal space factor, a change (e.g., a dent or warpage) of the circular pipe shape of the tubular member of the optical unit due to a compressive force or the like applied during the forming of the cable core or the covering with the cable jacket can be prevented. That is, the optical unit may be manufactured while reflecting in advance a decrease in the internal space factor, caused when the shape of the tubular member is changed during the manufacture of the optical unit.

That is, it will be defined herein that a state of the tubular member of the optical unit before the forming of the cable core is a state in which the shape of the tubular member is not changed, and a state of the tubular member after the forming of the cable core and the covering with the cable jacket is a state in which the shape of the tubular member is changed.

When the optical fiber 11 or the rollable optical fiber ribbon 15 is added, the internal space factor may exceed the above range. When an internal space factor of the tubular member 20 of the optical unit 10 increases, a total outer diameter of the optical cable 100 may decrease but a waterproof material (not shown), such as waterproof powder, waterproof yarn or waterproof jelly, filling the tubular member 20 for the purpose of waterproofing may not be uniformly distributed between optical fibers 11. Thus, waterproof performance may be difficult to secure when moisture permeates, and optical loss may increase or optical properties may deteriorate when the optical cable 100 is bent or compressed or external impact is applied. In contrast, when the internal space factor of the tubular member 20 of the optical unit 10 is reduced by reducing the number of optical fibers 11 in the tubular member 20, there may be an excessive empty space in the tubular member 20 and thus the empty space or gaps in tubular member 20 cannot be covered sufficiently with the waterproof material injected into the tubular member 20. Thus, waterproof performance may decrease and the outer diameter of the optical cable 100 may increases as described above.

In the optical cable 100 according to the present disclosure, a shape of a cross-sectional area of the tubular member 20 of the optical unit 10 changes in the longitudinal direction when the tubular member 20 is accommodated in the cable jacket 80 in a state in which the plurality of optical fibers 11 are accommodated therein. Thus, the space factor of the optical fibers 11 in the tubular member 20 of the optical unit 10 changes.

In the optical cable 100 according to the present disclosure shown in FIG. 2, one optical unit 10 is disposed at a center of the optical cable 100 and five optical units 10 are disosed around the optical unit 10.

When the optical cable 100 of the present disclosure is configured by accommodating the optical unit 10' of FIG. 1 in the cable jacket 80, the shape of the tubular member 20 may be changed according to the shape of a space in the cable jacket 80.

In this process, the shape of a cross section of the tubular member 20 is changed in the longitudinal direction and the space factor of the optical fibers 11 in the tubular member 20 of the optical unit 10 changes, when the tubular member 20 accommodating the plurality of optical fibers 11 therein is accommodated in the cable jacket 80.

Here, the "internal space factor" of the optical unit 10 should be understood to mean a ratio (%) of the sum of areas of the optical fibers in the tubular member 20 to a cross-sectional area of the inside of the tubular member 20.

Therefore, when the shape of the optical unit formed using a circular tubular member changes, the area of the inside of the tubular member of the optical unit changes but the areas of the optical fibers are the same. Therefore, the internal space factor may change.

As shown in FIGS. 1 and 2, the tubular member 20 of the optical unit 10 may be maintained in a circular shape in a tubing state in which the optical fiber ribbons 15 or the like is accommodated therein. However, the shape of the tubular member may change to an indefinite shape corresponding to the shape of a space in contact with the cable jacket 80, because the tubular member 20 is formed of a material having a small thickness or having low hardness, low modulus of elasticity, or flexible compared to the cable jacket.

A cable core may be configured by forming the cable core by aggregating a plurality of optical units 10' such as that shown in FIG. 1 by twisting the plurality of optical units 10' with a predetermined pitch, and an optical cable may be manufactured by the covering with the cable jacket by supplying the cable core and covering the optical cable with a cable jacket.

As shown in FIG. 2, in the forming of the cable core or the covering with the cable jacket, the shape of the optical unit 10 may be changed to an indefinite shape corresponding to the shape of the space in contact with the cable jacket 80 when the optical unit 10 is accommodated in the cable jacket 80. The tubular members 20 of the six optical units 10 shown in FIG. 2 are naturally crushed due to interference with a surrounding object according to the positions thereof, thus causing a change of the shapes thereof, and thus the space factor of the optical fibers 11 in the optical units 10 increase gradually.

That is, the space factor of the optical fibers 11 may increase to be in a range of 68% to 83% in the covering with the cable jacket by aggregating the plurality of optical units 10' by twisting them with the predetermined pitch.

Experimentally, it was confirmed that when the space factor of the optical fibers 11 increased to be greater than 83% due to the change of the shape of the tubular member 20, an internal empty space of the tubular member 20 became insufficient and thus a waterproof material filling the tubular member 20 was not uniformly distributed, thus decreasing waterproof performance, and problems such as the deterioration of optical properties, e.g., an increase in optical loss, occurred frequently when the optical cable 100 was bent or compressed or external impact or like was applied. When the space factor of the optical fibers 11 was less than 68% due to the change of the shape of the tubular member 20, problems such as the deterioration of optical properties did not occur but an empty space was extremely large and thus a space that cannot be covered with the waterproof material increased, thus decreasing waterproof performance.

Therefore, according to the present disclosure, a diameter or thickness of the tubular member 20 is determined during the design of a cable, such that a space factor of the optical fibers 11 is in a range of 68% to 83% when a shape of the tubular member 20 is changed due to the accommodation of the optical unit 10 in the cable jacket 80.

In the covering with the cable jacket, a strain ratio of an internal cross-sectional area of the optical unit may be in a range of 7% to 41% due to a change in a shape of the tubular member of the optical unit. Here, the strain ratio of the internal cross-sectional area of the optical unit may be calculated by an equation of:

strain ratio of internal cross-sectional area of optical unit=(internal cross-sectional area of optical unit before change in shape-internal cross-sectional area of optical unit after change in shape)/internal cross-sectional area of optical unit before change×100%

Experimentally, it was confirmed that when a strain ratio of an internal cross-sectional area of the optical unit 10 increased to be greater than 41% due to a change in the shape of the tubular member 20, the original shape, e.g., a circular or oval shape with a small curvature, of the tubular member 20 changed to a large extent, thus pressurizing the optical fibers accommodated in the tubular member 20, and therefore, optical properties may deteriorate. When the strain ratio of the internal cross-sectional area of the optical unit 10 was less than 7%, an empty space between the cable jacket and the optical unit 10 was large and thus waterproof performance decreased.

A strain ratio of the internal cross-sectional area of the optical unit when a rollable optical fiber ribbon was accommodated in the tubular member of the optical unit was substantially the same as that when a number of optical fibers are accommodated in the tubular member.

As described above, when forming the tubular member 20 of the optical unit 10 using a material that is thin or more flexible than the cable jacket, the shape of the optical unit 10 is naturally changed according to the shape of a space of an internal empty space of the cable jacket 80, which is allocated to the optical unit 10, thereby increasing the internal space factor of the optical unit 10, when a diameter and thickness of the tubular member 20 are set to increase an internal space factor while the optical unit 10 is accommodated in the optical cable 100.

When a size of the tubular member 20 is determined such that the internal space factor of the optical unit 10 shown in FIG. 1, i.e., an internal space factor during an extruding operation of the tubular member 20 before the shape of the optical unit 10 in the cable jacket 80 is changed, is in a range of 68% to 83%, the internal space factor becomes 83% or more and thus a waterproof material may not be uniformly distributed when accommodated in the optical cable 100 as shown in FIG. 2. Therefore, optical loss or the like may occur when the optical cable 100 is bent.

Problems such as the deterioration of optical properties or waterproof performance may not occur but an outer diameter of the optical cable may increase greatly, thus preventing achievement of an optical cable with a small diameter, when the optical unit 10 is configured such that the internal space factor thereof is in the range of 68% to 83% to achieve waterproof performance or optical properties when bent and a change in the shape of the tubular member 20 is prevented.

Such a plurality of optical units 10 may be twisted with a predetermined pitch or aggregated through a binding tape 50 as a binding member or a binder to form a cable core C. The binding member may be in the form of tape, binding yarn or the like.

The cable core C of the optical cable 100 may be covered with the cable jacket 80 to form the optical cable 100.

Alternatively, a ripcord 60 or the like may be provided between the binding tape 50 and the cable jacket 80 to remove the cable jacket 80.

The ripcord 60 may be provided to strip the cable jacket 80 for connection of the optical cable 100. The ripcord 60 may be in the form of a fiber, and a pair of ripcords 60 may be provided at a position or symmetrical positions as shown in FIG. 2.

In the embodiment of FIG. 2, at least one reinforcing member 70 or the like may be provided in the cable jacket 80 to reinforce rigidity, thereby reinforcing tensile strength of the optical cable 100.

The reinforcing member 70 may be in the form of a wire formed of fiber-reinforced plastics (FRP) or the like, and be provided in the longitudinal direction of the optical cable 100 to be buried inside the cable jacket 80 when the cable jacket 80 is extruded.

Such an optical cable may be manufactured by an optical cable manufacturing method including forming rollable optical fiber ribbons by binding a plurality of optical fibers in parallel by forming multiple bonded parts at separate positions between adjacent optical fibers, forming each of optical units by extruding a tubular member accommodating rollable optical fiber ribbons therein to achieve an internal space factor of 53% to 75%, forming a cable core by aggregating the plurality of optical units by twisting the plurality of optical units with a predetermined pitch, and covering with a cable jacket by supplying the cable core formed in the forming of the cable core and covering the cable core with the cable jacket.

In the covering with the cable jacket, a space factor of optical fibers in tubular members of the optical units may be in a range of 68% to 83% due to a change in the shape of the tubular members, and a strain ratio of an internal cross-sectional area of the optical unit may be in a range of 7% to 41% as described above.

The optical cable 100 of FIG. 2 is an example in which twelve optical fiber ribbons 15 each including twelve optical fibers 11 form one optical unit 10 and six optical units 10 are included in one optical cable 100 to obtain a large-capacity optical cable 100 with a total of 864 core wires. However, a large-capacity optical cable with a variable number of optical fibers may be manufactured by setting 100 to 400 optical fibers to be accommodated in a tubular member of one optical unit and setting 20 optical units or less to form the optical cable.

That is, the number of core wires of optical fibers to be accommodated in one optical unit and the number of optical units of one optical cable may be increased or decreased.

Figure 3:
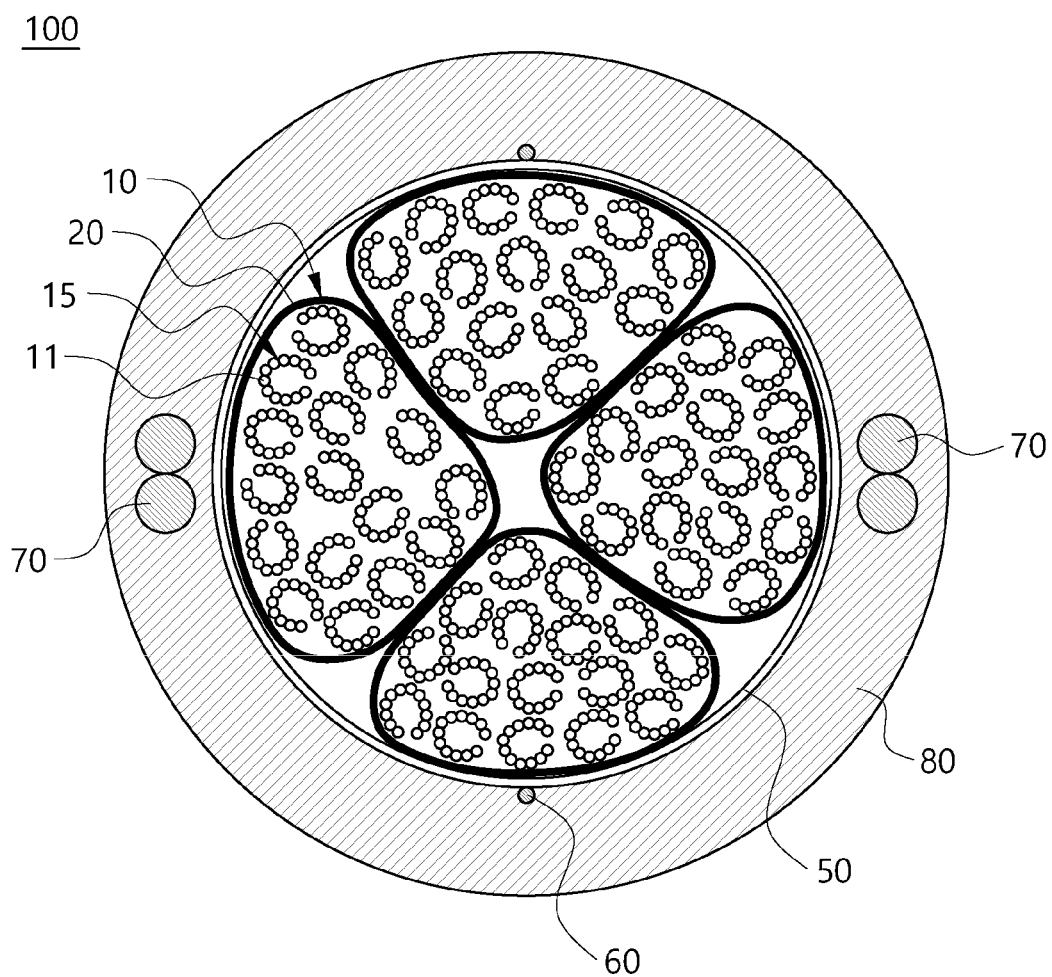
FIG. 3 is a cross-sectional view of an optical cable according to another embodiment of the present disclosure.

FIG. 3 is a cross-sectional view of an optical cable 1000 according to another embodiment of the present disclosure.

In the optical cable 100 of FIG. 2, twelve optical fiber ribbons 15 each including twelve optical fibers 11 form one optical unit 10, and six optical units 10 are included in the optical cable 100 to form a large-capacity optical cable 100 with a total of 864 core wires.

However, in the embodiment of FIG. 3, an example in which sixteen optical fiber ribbons 15 each including twelve optical fibers 11 form one optical unit 10, and four optical units 10 are arranged on four parts of an internal space of the optical cable 100 without an optical unit 10 at a center of the optical cable 100 to form a large-capacity optical cable 100 with a total of 768 core wires.

In the embodiment of FIG. 3, a pair of reinforcing members 70 are provided on opposite positions on a cable jacket 80, unlike the reinforcing members of the embodiment illustrated in FIG. 2. By adjusting a diameter of and the number of reinforcing members 70 as described above, sufficient tensile strength may be provided while minimizing a thickness occupied by the reinforcing members 70.

As such, a large-capacity optical cable may be formed using various combinations of the number of optical units of an optical cable and the number of optical fibers or optical fiber ribbons accommodated in each optical unit.

Accordingly, the optical cable 100 having the above structure according to the present disclosure shown in FIG. 2 or 3 includes a number of optical fibers 11 to minimize optical loss or the deterioration of optical properties, secure waterproof performance, and minimize an outer diameter, and the shape thereof is variable to optimize a space factor of optical fibers, when the optical cable 100 is bent or compressed or external impact is applied.

Table 1 below shows rates of change in internal cross-sectional areas of optical units due to a change in space factors (%) of optical fibers in the optical units before and after the formation of cores according to various examples and comparative examples, and a result of testing waterproof properties and optical properties.

thus an internal empty space of a tubular member was extremely large. Therefore, a space that cannot be covered with a waterproof material was large and thus waterproof performance was poor. In Comparative example 4, a space factor of the optical fibers after the change in shape was higher than the appropriate occupancy rate and thus the optical properties of optical fibers in tubular member deteriorated due to pressure applied from the tubular member or between the optical fibers.

TABLE 1

|  | Example 1 | Example 2 | Example 3 | Comparative example 1 | Comparative example 2 | Comparative example 3 | Comparative example 4 | Comparative example 5 | Comparative example 6 |
| --- | --- | --- | --- | --- | --- | --- | --- | --- | --- |
| Space factor [%] of optical fibers in optical unit before formation of cable core | 53 | 64 | 75 | 49 | 77 | 58 | 70 | 74 | 55 |
| Space factor [%] of optical fibers in optical unit after formation of cable core | 68 | 75 | 83 | 67 | 84 | 65 | 86 | 79 | 78 |
| Rate of change [%] of internal cross-sectional area of optical unit | 28.3 | 17.2 | 10.7 | 36.7 | 9.1 | 12.1 | 22.0 | 6.8 | 41.8 |
| Waterproof properties | ○ | ○ | ○ | X | X | X | ○ | X | ○ |
| Optical properties | ○ | ○ | ○ | ○ | X | ○ | X | ○ | X |

In Table 1 above, for an evaluation of waterproof properties, a water penetration length test was conducted by a method according to IEC60794-1-2 F5, in which the height of water was 1 m and 3 m cables that are the same in terms of a structure and an outer diameter excluding the inside of a tubular member were used as cable samples. A result of this test was considered as good (pass) when water did not leak from an end of a cable. In Table 1 above, for an evaluation of optical properties, an optical signal loss test was conducted at a wavelength of 1550 nm at room temperature (23° C.) after a core was formed (after a change in shape), and a result of the test was determined as pass or failure by evaluating whether a loss value was 0.35 dB/km or less.

In Examples 1 to 3, when an optical unit in which a space factor of optical fibers before the formation of a core satisfied a range of 53% to 75% and a tubular member were applied, space factors[%] of the optical fibers in the optical units after the formation of the core (a change in shape) were measured as 68[%], 75 [%], and 83[%]. Therefore, it was confirmed that the space factors of the optical fibers in the optical units after the formation of the core satisfied the range of 68% to 83% and thus both waterproof properties and optical properties were good.

In contrast, in Comparative example 1, an internal space factor of an optical unit before a change of shape was 49[%], which was far lower than an appropriate occupancy rate, and thus waterproof properties were poor. In Comparative example 2, an internal space factor of an optical unit before a change of shape was 77[%], which was far higher than the appropriate occupancy rate, thus preventing a uniform distribution of a waterproof material such as waterproof powder of waterproof yarn between the optical fibers, and therefore, waterproof properties were poor and optical properties deteriorated.

In Comparative examples 3 and 4, a space factor of an optical fibers before a change in shape was in a normal range. However, in Comparative example 3, a space factor of the optical fibers after the change in shape was 65[%], which was lower than the appropriate occupancy rate, and In Comparative examples 5 and 6, space factors of optical fibers before and after a change in shape were in the normal range. However, in Comparative example 5, a rate of change in internal cross-sectional areas before and after the change in shape was lower than a normal range and thus waterproof properties were poor due to a large empty space, in which a waterproof member was insufficient, between a jacket and the optical unit or between optical units. In Comparative example 6, a rate of change in internal cross-sectional areas before and after the change in shape was higher than the normal range and therefore a circular shape of a tubular member deformed to a large extent and thus optical fibers are pressurized, resulting in the deterioration of optical properties.

While the present disclosure has been described above with respect to exemplary embodiments thereof, it would be understood by those of ordinary skill in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A manufacturing method of an optical cable, comprising:
    preparing each of optical units by extruding a tubular member accommodating a plurality of optical fibers therein to achieve an internal space factor of 53% to 75%;
    forming a cable core by aggregating optical units by twisting the optical units with a predetermined pitch; and
    covering with a cable jacket by supplying the cable core formed in the forming of the cable core and covering the cable core with the cable jacket,
    wherein, in the forming of the cable jacket, a space factor of optical fibers in the tubular member of each of the optical units is in a range of 68% to 83% due to a change in a shape of the tubular member.

2. A manufacturing method of an optical cable, comprising:
preparing each of optical units by extruding a tubular member accommodating a plurality of optical fibers therein to achieve an internal space factor of 53% to 75%;
forming a cable core by aggregating optical units by twisting the optical units with a predetermined pitch; and
covering with a cable jacket by supplying the cable core formed in the forming of the cable core and covering the cable core with the cable jacket,
wherein, in the covering with the cable jacket, a strain ratio of an internal cross-sectional area of each of the optical units is in a range of 7% to 41% due to a change in a shape of the tubular member of each of the optical units,
wherein the strain ratio is calculated by an equation of:

strain ratio of internal cross-sectional area of optical unit=(internal cross-sectional area of optical unit before change in shape-internal sectional area of optical unit after change in shape)/internal cross-sectional area of optical unit before change in shape of tubular member×100%.

3. A manufacturing method of an optical cable, comprising:
preparing rollable optical fiber ribbons by binding a plurality of optical fibers in parallel by forming multiple bonded parts at separate positions between adjacent optical fibers;
preparing each of optical units by extruding a tubular member accommodating a plurality of rollable optical fiber ribbons therein to achieve an internal space factor of 53% to 75%;
forming a cable core by aggregating the plurality of optical units; and
covering with a cable jacket by supplying the cable core formed in the forming of the cable core and covering the cable core with the cable jacket,
wherein, in the covering with the cable jacket, a space factor of optical fibers in the tubular member of each of the optical units is in a range of 68% to 83% due to a change in a shape of the tubular member.

4. A manufacturing method of an optical cable, comprising:
preparing rollable optical fiber ribbons by binding a plurality of optical fibers in parallel by forming multiple bonded parts at separate positions between adjacent optical fibers;
preparing each of optical units by extruding a tubular member accommodating a plurality of rollable optical fiber ribbons therein to achieve an internal space factor of 53% to 75%;
forming a cable core by aggregating the plurality of optical units; and
covering with a cable jacket by supplying the cable core formed in the forming of the cable core and covering the cable core with the cable jacket,
wherein, in the covering with the cable jacket, a strain ratio of an internal cross-sectional area of each of the optical units is in a range of 7% to 41% due to a change in a shape of the tubular member of each of the optical units,
wherein the strain ratio is calculated by an equation of:

strain ratio of internal cross-sectional area of optical unit=(internal cross-sectional area of optical unit before change in shape-internal cross-sectional area of optical unit after change in shape)/internal cross-sectional area of optical unit before change in shape×100%.

5. The manufacturing method of claim 4, wherein the forming of the cable core comprises forming the cable core by aggregating the plurality of optical units by twisting the plurality of optical units with a predetermined pitch.

6. The manufacturing method of claim 4, wherein the forming of the cable core comprises forming the cable core by aggregating the plurality of optical units with a binding member.

* * * * *